(12) United States Patent
Vu et al.

(10) Patent No.: US 11,146,127 B2
(45) Date of Patent: Oct. 12, 2021

(54) MOTOR AND REDUCTION GEAR

(71) Applicant: NIDEC CORPORATION, Kyoto (JP)

(72) Inventors: Ha Hai Vu, Taipei (TW); Chien Yu Chen, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 45 days.

(21) Appl. No.: 16/654,014

(22) Filed: Oct. 16, 2019

(65) Prior Publication Data

US 2020/0136443 A1 Apr. 30, 2020

(30) Foreign Application Priority Data

Oct. 29, 2018 (CN) .......................... 201811266126.8

(51) Int. Cl.
| | |
|---|---|
| H02K 1/18 | (2006.01) |
| H02K 5/04 | (2006.01) |
| H02K 15/02 | (2006.01) |
| H02K 7/116 | (2006.01) |

(52) U.S. Cl.
CPC ............... *H02K 1/187* (2013.01); *H02K 5/04* (2013.01); *H02K 15/02* (2013.01); *H02K 7/116* (2013.01)

(58) Field of Classification Search
CPC .......... H02K 1/187; H02K 5/04; H02K 15/02; H02K 7/116
USPC ...................... 310/75 R, 89, 98, 99, 268, 418
See application file for complete search history.

(56) References Cited

U.S. PATENT DOCUMENTS

| | | | | |
|---|---|---|---|---|
| 3,477,378 A | * | 11/1969 | Shelhart | B60J 7/0573 417/420 |
| 4,129,796 A | | 12/1978 | Papst | |
| 4,631,433 A | | 12/1986 | Stokes | |
| 4,891,726 A | * | 1/1990 | Suwa | G11B 5/53 360/130.23 |
| 5,809,809 A | * | 9/1998 | Neumann | H02K 7/14 68/140 |
| 6,051,900 A | * | 4/2000 | Yamaguchi | H02K 7/063 310/216.064 |
| 8,792,204 B2 | * | 7/2014 | Tatsumi | G11B 19/2009 360/98.07 |
| 10,591,079 B2 | | 3/2020 | Yamanaka et al. | |
| 2002/0053225 A1 | * | 5/2002 | Bierbach | D06F 37/304 68/140 |
| 2008/0129130 A1 | * | 6/2008 | Mun | H02K 7/063 310/71 |

(Continued)

FOREIGN PATENT DOCUMENTS

| | | |
|---|---|---|
| CN | 2550949 | 5/2003 |
| CN | 107709728 | 2/2018 |
| CN | 207304225 | 5/2018 |

*Primary Examiner* — Jose A Gonzalez Quinones
(74) *Attorney, Agent, or Firm* — JCIPRNET (57) ABSTRACT

A motor includes a motor body, a first cover covering at least one part of the motor body on the radial outer side of the motor body, and a second cover covering at least one part of the motor body on one axial side and the radial outer side of the motor body. The first and second covers make contact on the radial outer side of the motor body. The second cover includes first and second parts, the first part is in a disk shape, the second part is located on the radial outer side of at least one part of the first part and includes a wall part and an eave part, the wall part is formed in the axial direction, and the eave part is formed in the radial direction from one axial end of the radial outer side of the wall part.

14 Claims, 7 Drawing Sheets

(56) References Cited

U.S. PATENT DOCUMENTS

2018/0283525 A1* 10/2018 Uematsu .............. H02K 1/2733
2019/0364426 A1* 11/2019 Muthukrishnan ....... B60R 13/10

* cited by examiner

MOTOR AND REDUCTION GEAR

CROSS-REFERENCE TO RELATED APPLICATION

This application claims the priority of China patent application serial no. 201811266126.8, filed on Oct. 29, 2018. The entirety of the above-mentioned patent application is hereby incorporated by reference herein and made a part of this specification.

BACKGROUND

1. Technical Field

The disclosure relates to the field of motors, and in particular, to a motor and a reduction gear including the motor.

2. Description of Related Art

For an existing motor, especially a small motor, plastics are usually used for manufacturing a shield (cover) for the motor; however, a large amount of heat is generated when the motor runs and results in the high temperature, usually reaching to 80-200° C. of the shield (cover) of the motor, and therefore the degradation of the mechanical property of plastic materials or excessive thermal creep in a plastic structure is probably caused.

In order to solve the problem, a scheme for enabling an end structure of the motor to adopt a plastic end cap or a thermal barrier made of low thermal conductivity plastics is introduced in patent document U.S. Pat. No. 4,631,433, in the end structure, a plurality of vents is used for heat dissipation, which results in incomplete sealing of the motor, and the design scheme is infeasible for the motor needing complete sealing.

In addition, in the patent document U.S. Pat. No. 4,129,796, the scheme that a shell part is made of high thermal conductivity metal materials to achieve the purpose of heat dissipation; and however, the shell part made of the metal materials results in the large total weight of the motor, which goes against the lightweight of the motor.

It should be noted that the above description of the background is merely provided for clear and complete explanation of the disclosure and for easy understanding by those skilled in the art. And it should not be understood that the above technical solution is known to those skilled in the art as it is described in the background of the disclosure.

SUMMARY

According to the first aspect of the embodiments of the disclosure, the motor is provided and has a motor body, disposed to be capable of rotating with the central axis as the centre; a first cover, covering at least one part of the motor body on the radial outer side of the motor body; and a second cover, covering at least one part of the motor body on one axial side and the radial outer side of the motor body. The first cover and the second cover make contact on the radial outer side of the motor body. The second cover is composed of a first part and a second part, the first part is in a disk shape extending along the plane perpendicular to the axial direction, the second part is placed on the radial outer side of the at least one part of the first part and comprises a wall part and an eave part, the wall part is formed in the axial direction with the central axis of the motor body as the centre, and the eave part is formed in the radial direction from one axial end of the radial outer side of the wall part.

With reference to the following description and drawings, the particular embodiments of the disclosure are disclosed in detail, and the principle of the disclosure and the manners of use are indicated. It should be understood that the scope of the embodiments of the disclosure is not limited thereto. The embodiments of the disclosure contain many alternations, modifications and equivalents within the scope of the terms of the appended claims.

BRIEF DESCRIPTION OF THE DRAWINGS

The drawings are included to provide further understanding of the disclosure which constitute a part of the specification and illustrate the embodiments of the disclosure, and are used for setting forth the principles of the disclosure together with the description. It is obvious that the accompanying drawings in the following description are some embodiments of the disclosure, and for those of ordinary skills in the art, other accompanying drawings may be obtained according to these accompanying drawings without making an inventive effort. In the drawings.

DESCRIPTION OF THE EMBODIMENTS

The embodiments of the disclosure provide a motor and a reduction gear.

According to the first aspect of the embodiments of the disclosure, the motor is provided and has a motor body, disposed to be capable of rotating with the central axis as the centre; a first cover, covering at least one part of the motor body on the radial outer side of the motor body; and a second cover, covering at least one part of the motor body on one axial side and the radial outer side of the motor body. The first cover and the second cover make contact on the radial outer side of the motor body. The second cover is composed of a first part and a second part, the first part is in a disk shape extending along the plane perpendicular to the axial direction, the second part is placed on the radial outer side of the at least one part of the first part and comprises a wall part and an eave part, the wall part is formed in the axial direction with the central axis of the motor body as the centre, and the eave part is formed in the radial direction from one axial end of the radial outer side of the wall part.

According to the second aspect of the embodiments of the disclosure, the motor as the first aspect is provided, wherein protrusion parts are arranged on the surface of one side of the eave part.

According to the third aspect of the embodiments of the disclosure, the motor as the second aspect is provided, wherein the protrusion parts are formed in a cylindrical shape or a rib shape.

According to the fourth aspect of the embodiments of the disclosure, the motor as the first aspect is provided, wherein the eave part is formed by a plurality of stage parts and a plurality of notch parts which are disposed alternately.

According to the fifth aspect of the embodiments of the disclosure, the motor as the fourth aspect is provided, wherein a protrusion part is arranged on the surface of one side of each stage part.

According to the sixth aspect of the embodiments of the disclosure, the motor as the fifth aspect is provided, wherein the protrusion parts are formed in a cylindrical shape or a rib shape.

According to the seventh aspect of the embodiments of the disclosure, the motor as the first aspect is provided, wherein a first joint part is formed at the position, close to the second part, of the first part, a second joint part is formed at the position, close to the first part, of the second part, and the first joint part and the second joint part enable the first part and the second part to be jointed together.

According to the eighth aspect of the embodiments of the disclosure, the motor as the seventh aspect is provided, wherein the first joint part is a clamping part formed towards the radial outer side, the second joint part is a groove formed towards the radial outer side from the wall part of the second part, and the clamping part is inserted into the groove to enable the first part and the second part to be embedded together.

According to the ninth aspect of the embodiments of the disclosure, the motor as the seventh aspect is provided, wherein the first joint part and the second joint part are both sticking faces, and the first part and the second part are bonded together through the sticking faces.

According to the tenth aspect of the embodiments of the disclosure, the motor as any one of the first aspect to the ninth aspect is provided, wherein the first part is made of a plastic material, and the second part is made of a metal material.

According to the eleventh aspect of the embodiments of the disclosure, the motor as any one of the first aspect to the ninth aspect is provided, wherein the second part is made of a material with the thermal conductivity not lower than 200 W/mK.

According to the twelfth aspect of the embodiments of the disclosure, the motor as any one of the first aspect to the ninth aspect is provided, wherein the size ratio of the first part to the second part is 7 to 3.

According to the thirteenth aspect of the embodiments of the disclosure, the motor as the first aspect is provided, wherein the motor is an axial magnetic flux motor.

According to the fourteenth aspect of the embodiments of the disclosure, the reduction gear is provided and has the motor and a reduction assembly connected with the motor axially, wherein the motor is the motor as any one of the first aspect to the thirteenth aspect, the reduction assembly has a gear and a gear cover disposed opposite to the gear in the radial direction, and the gear and the gear cover are disposed on the other axial side of the motor body.

The disclosure has the beneficial effects that heat generated in the motor can be well dissipated through the motor in the embodiments of the disclosure, so that the temperature of the motor can be lowered, and the mechanical property of internal parts of the motor is not damaged.

These and further aspects and features of the disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of the disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of the disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

For convenience of explanation, in the following explanations of the disclosure, the direction extending along the central axis of a motor or a direction parallel to the direction is named as the 'axial direction', the radius direction with the central axial as the centre is named as the 'radial direction', the direction surrounding the central axis is named as the 'circumferential direction', but it is just for convenience of explanations but not limited to the direction of the motor during using and manufacturing.

Embodiment 1

The embodiment of the disclosure provides a motor.

Figure 1:
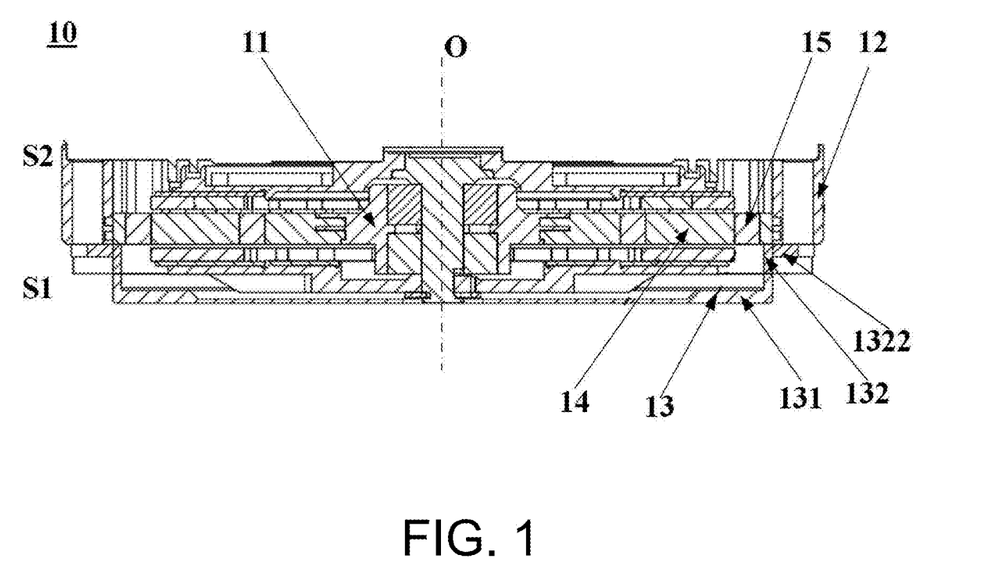
FIG. 1 is a schematic structural view of a motor of embodiment 1 of the disclosure.
Figure 2:
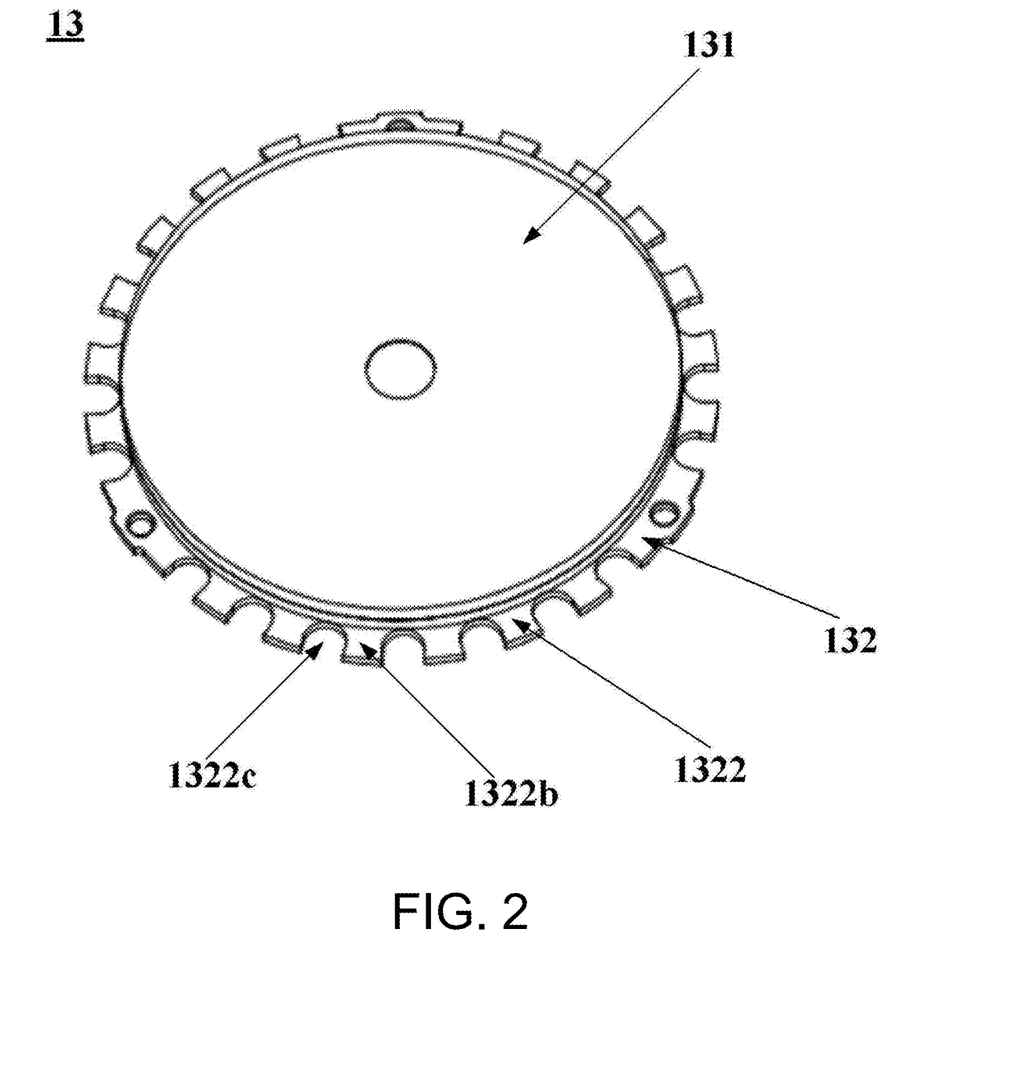
FIG. 2 is a schematic structural view of a second cover of embodiment 1 of the disclosure.
Figure 3:
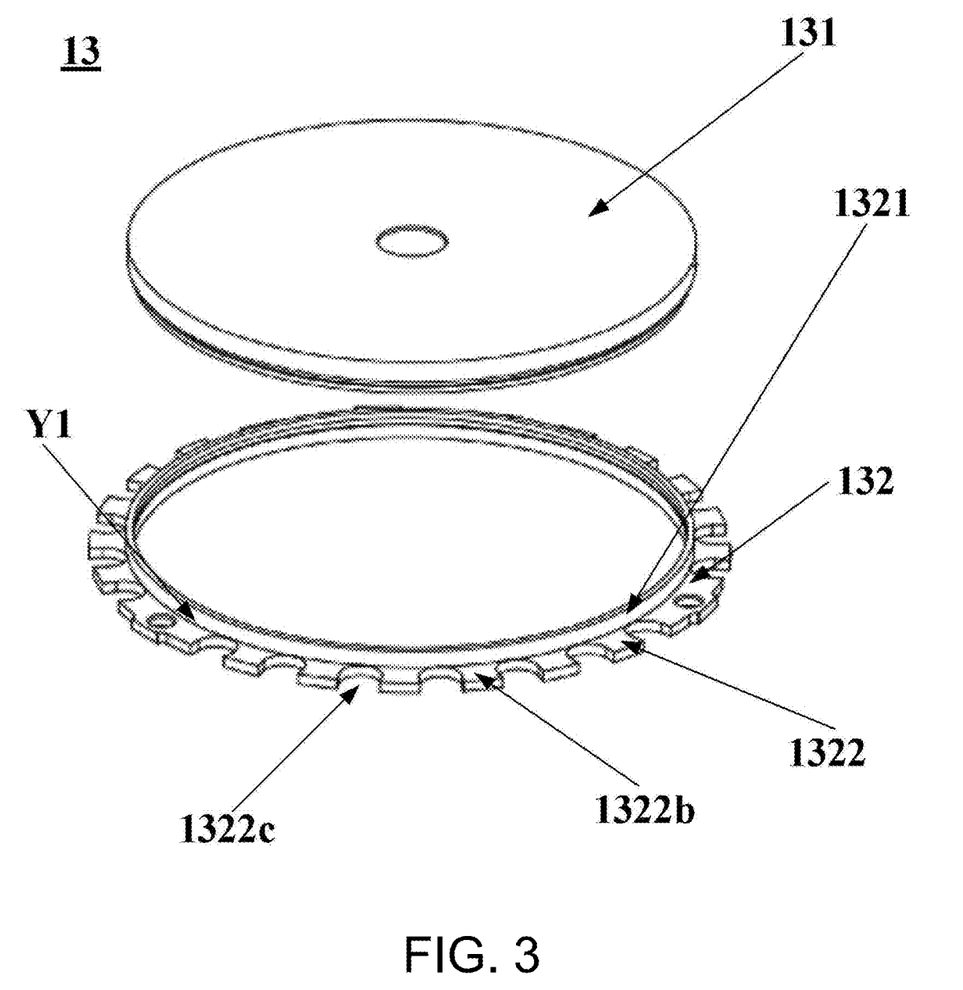
FIG. 3 is an exploded view of the second cover of embodiment 1 of the disclosure.

FIG. 1 is a schematic structural view of the motor of embodiment 1 of the disclosure; FIG. 2 is a schematic structural view of a second cover in embodiment 1 of the disclosure; FIG. 3 is an exploded view of the second cover of embodiment 1 of the disclosure.

As shown in FIG. 1 to FIG. 3, the motor 10 has a motor body 11, a first cover 12 and the second cover 13.

The motor body 11 is disposed to be capable of rotating with a central axis O as the centre, the first cover 12 covers at least one part of the motor body 11 on the radial outer side of the motor body 11, the second cover 13 covers at least one part of the motor body 11 on one axial side S1 and the radial outer side of the motor body 11, and the first cover 12 and the second cover 13 make contact on the radial outer side of the motor body 11.

In the present embodiment, as shown in FIG. 1 to FIG. 3, the second cover 13 is composed of a first part 131 and a second part 132. The first part 131 is in a disk shape extending along the plane perpendicular to the axial direction, the second part 132 is located on the radial outer side of at least one part of the first part 131, the second part 132 comprises a wall part 1321 and an eave part 1322, the wall part 1321 is formed in the axial direction with the central axis O of the motor body 11 as the centre, and the eave part 1322 is formed in the radial direction from one axial end Y1 of the radial outer side of the wall part 1321.

Through the structure, heat generated in the motor can be well dissipated, so that the temperature of the motor is lowered, and the mechanical property of internal parts of the motor is not damaged.

In the present embodiment, as shown in FIG. 1, the motor 10 further comprises a winding coil 14, an insulating part 15 making contact with the winding coil 14 and made of epoxy resin and other constituent parts, the structures of the other constituent parts of the motor 10 and the structures of the winding coil 14 and the insulating part 15 can be referenced to the prior art, and the descriptions thereof are omitted herein.

Figure 6:
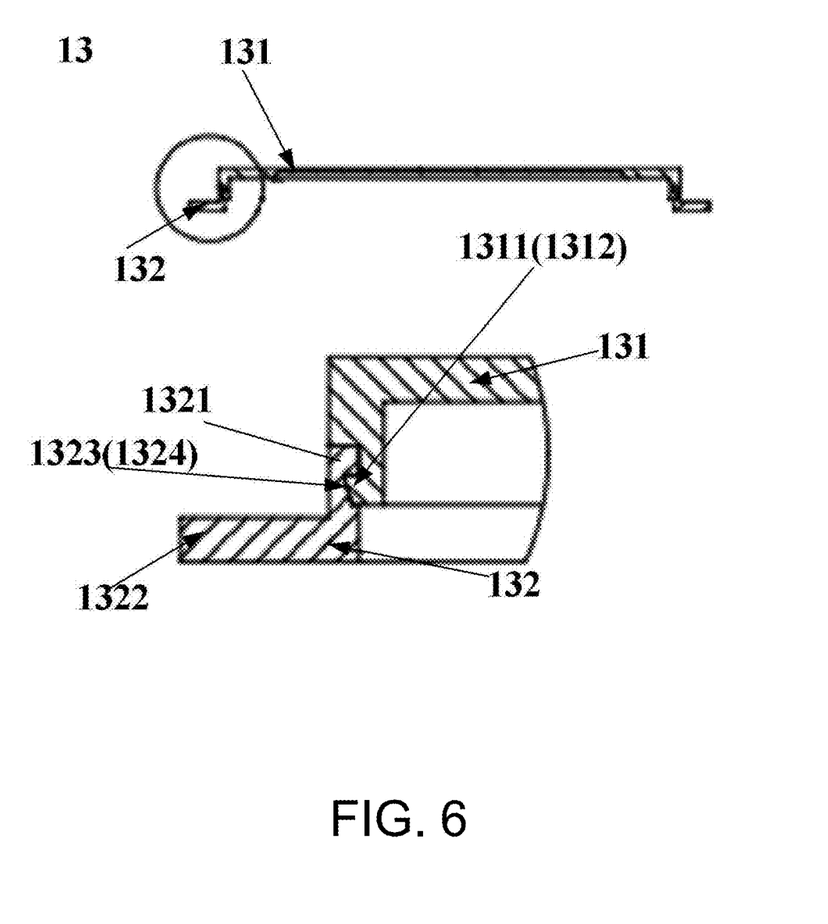
FIG. 6 is a partial enlarged view of the second cover of embodiment 1 of the disclosure.

In the present embodiment, as shown in FIG. 1 and FIG. 2, the second cover 13 can be formed in a hat rim shape as a whole (as shown in FIG. 6). The first part 131 of the second cover 13 covers an opening of one axial side S1 of the motor body 11, the second part 132 covers at least one part of the radial outer side of the motor body 11, and moreover, the second part 132 of the second cover 13 makes contact with the first cover 12 on the radial outer side of the motor body 11, that is, the second cover 13 covers one axial end of the motor body 11 like a hat.

Thus, in the running process of the motor 10, heat generated by copper loss of the winding coil 14 is transferred to the second part 132 of the second cover 13 through the insulating part 15 and the first cover 12, the heat dissipation surface area of the motor 10 can be enlarged through the second part 132 of the second cover 13, and therefore the temperature of the motor 10 is lowered.

In the present embodiment, as shown in FIG. 1, the second part 132 makes axial contact with the first cover 12 on the radial outer side of the motor body 11, that is, the contact face of the second part 132 and the first cover 12 are oppositely disposed in the axial direction; but the disclosure is not limited thereto, the contact face of the second part 132 and the first cover 12 are also oppositely disposed in the radial direction, therefore, the contact area of the first cover 12 and the second part 132 can be further enlarged, and heat can be transferred and dissipated more quickly.

In the present embodiment, protrusion parts can be arranged on the surface of one side of the eave part 1322, the protrusion parts can be formed in a cylindrical shape or a rib shape, and therefore the heat dissipation area of the eave part 1322 can be enlarged. But the present embodiment is not limited thereto. The protrusion parts can also be formed in other shapes.

In the present embodiment, as shown in FIG. 2 and FIG. 3, the eave part 1322 can be formed by a plurality of stage parts 1322b and a plurality of notch parts 1322c which are disposed alternately, but the present embodiment is not limited thereto, the eave part 1322 can also be formed in other shapes, and any structures capable of enlarging a hollow-out part of the eave part 1322 are included in the present embodiment. Through the structure of the eave part 1322, the weight of the motor can also be lowered while the heat dissipation area of the eave part 1322 is enlarged.

In the present embodiment, the protrusion parts can be formed on the surface of one side of the stage parts 1322b.

Figure 4:
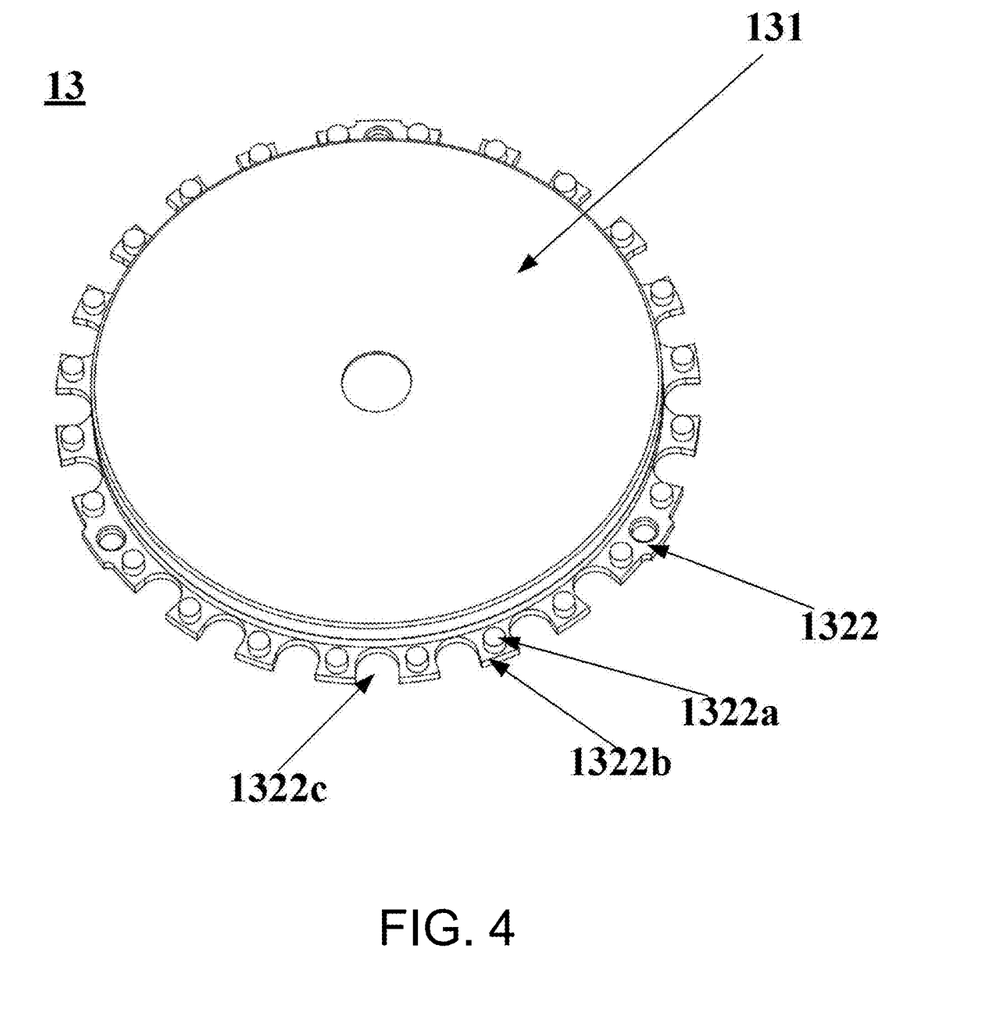
FIG. 4 is a schematic view of the second cover of one mode of execution of embodiment 1 of the disclosure.
Figure 5:
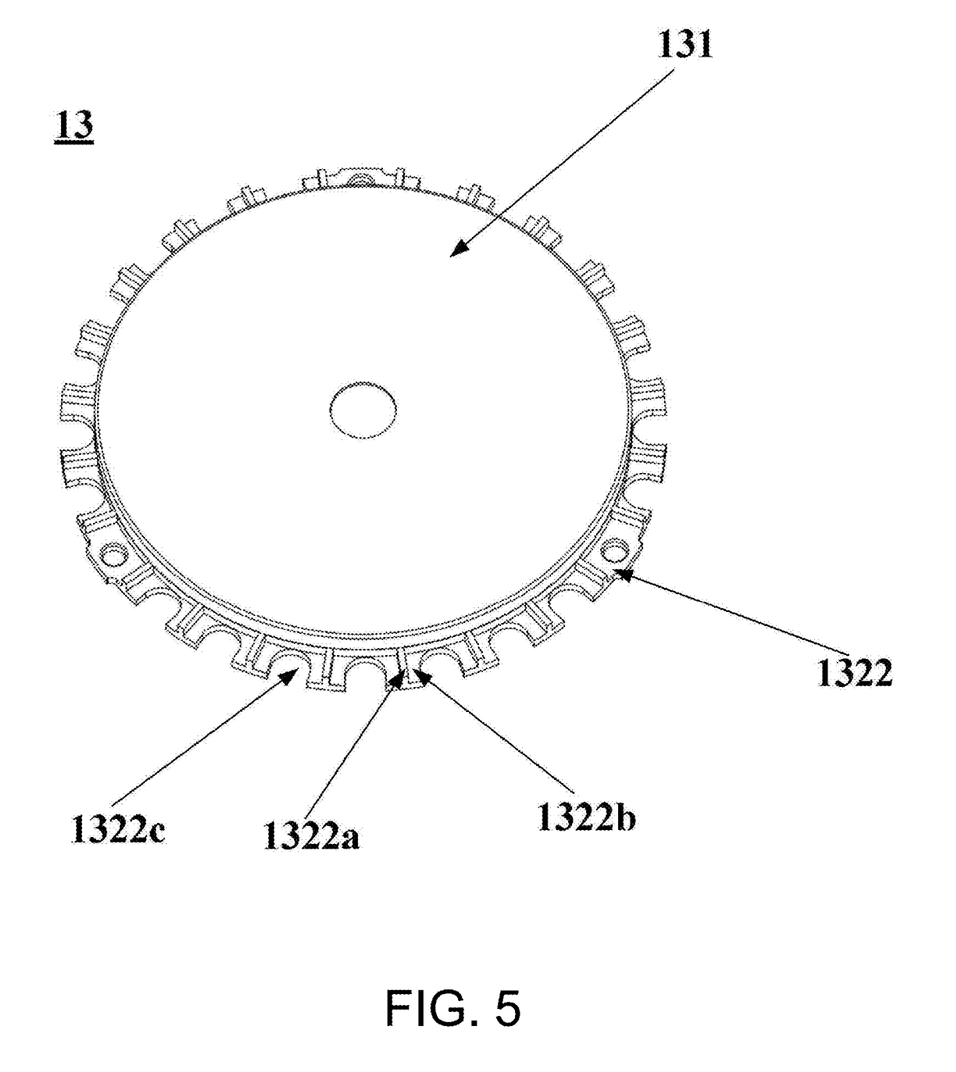
FIG. 5 is a schematic view of the second cover of another mode of execution of embodiment 1 of the disclosure.

FIG. 4 is a schematic view of the second cover 13 of one mode of execution of embodiment 1 of the disclosure; FIG. 5 is a schematic view of the second cover 13 of another mode of execution of embodiment 1 of the disclosure. As shown in FIG. 4 and FIG. 5, the protrusion parts 1322a are arranged on the surfaces of the sides, away from the first cover 12, of the stage parts 1322b, but the present embodiment is not limited thereto, and the protrusion parts 1322a can also be arranged on the surfaces of the other sides of the stage parts 1322b. Specifically, the protrusion parts 1322a can be formed in a cylindrical shape (as FIG. 4) or a rib shape (as FIG. 5), but for the specific shape of the protrusion parts 1322a, the present embodiment is not limited thereto.

In the present embodiment, in order to enable the first part 131 and the second part 132 to be mutually and fixedly jointed, a first joint part 1311 is formed at the position, close to the second part 132, of the first part 131, a second joint part 1323 is formed at the position, close to the first part 131, of the second part 132, and the first joint part 1311 and the second joint part 1323 enable the first part 131 and the second part 132 to be jointed together.

FIG. 6 is a partial enlarged view of the second cover 13 of embodiment 1 of the disclosure.

In the present embodiment, as shown in FIG. 6, the first joint part 1311 is a clamping part 1312 formed towards the radial outer side, the second joint part 1323 is a groove 1324 formed towards the radial outer side from the wall part 1321 of the second part 132, and the clamping part 1312 is inserted into the groove 1324 to enable the first part 131 and the second part 132 to be embedded together; therefore, the first part 131 and the second part 132 are mutually and fixedly jointed through the mutual cooperation of the clamping part 1312 and the groove 1324.

But the present embodiment is not limited to the above modes of execution, for example, the first joint part 1311 and the second joint part 1323 can also be sticking faces. In the mode of execution in FIG. 6, the sticking faces can be the contact faces of the first part 131 and the second part 132, and the first part 131 and the second part 132 can be bonded together through the sticking faces. Accordingly, the first part 131 and the second part 132 can be mutually and fixedly jointed in a sticking mode.

Or, knurling patterns in concave-convex fit are formed on the contact faces of the first part 131 and the second part 132 respectively, so that the first part 131 and the second part 131 are mutually and fixedly jointed through the mutual cooperation of the knurling patterns on the contact faces.

The above modes of execution are just for illustration, the present embodiment does not limit the joint modes of the first part 131 and the second part 132, and any means or structure capable of enabling the first part 131 and the second part 132 to be jointed together is included within the scope of the present application. For example, the first part 131 and the second part 132 can also be mutually and fixedly jointed through screws, nuts and the like.

In the present embodiment, the first part 131 can be made of a plastic material, such as a thermoplastic resin PA66 material, and the second part 132 can be made of a metal material. Because the second part 132 is made of the metal material, the heat conductivity of the second part 132 can be improved, heat dissipation of the motor is facilitated, and the lightweight of the motor can also be facilitated since the first part 131 farther away from the first cover 12 than the second part 132 is made of plastic.

In the present embodiment, the second part 132 is made of a material with the heat conductivity not lower than 200 W/mK, for example, the second part 132 can be made of aluminium or copper with the heat conductivity being 200-400 W/mK, and therefore a better heat dissipation effect is achieved.

In the present embodiment, the size ratio of the first part 131 to the second part 132 can be 7 to 3, and the second cover 13 constituted according to the size ratio and comprising the first part 131 and the second part 132 is beneficial to heat dissipation of the motor and also is beneficial to the lightweight of the motor.

In the present embodiment, the motor 10 can be, for example, an axial magnetic flux motor.

Through the structure of the motor of the disclosure, heat generated in the motor can be well dissipated, so that the temperature of the motor can be lowered, the mechanical property of internal parts of the motor is not damaged, and the lightweight of the motor is facilitated.

Embodiment 2

Figure 7:
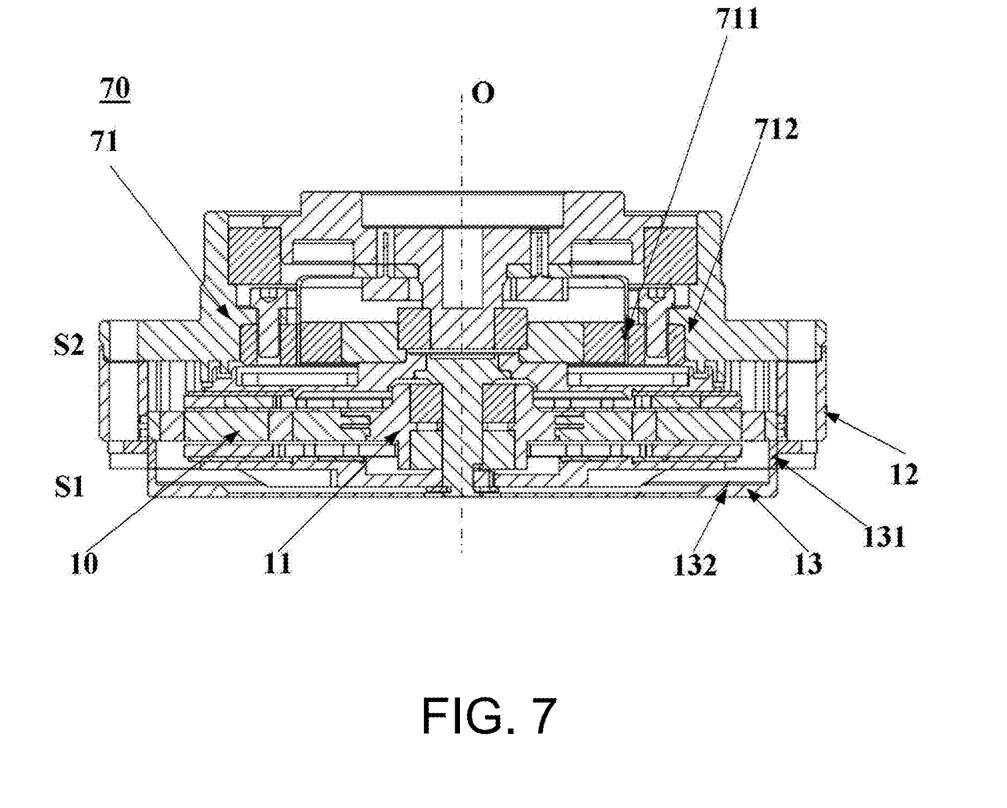
FIG. 7 is a schematic structural view of a reduction gear of embodiment 2 of the disclosure.

The embodiment of the disclosure further provides a reduction gear, and FIG. 7 is a schematic structural view of the reduction gear of embodiment 2 of the disclosure.

As shown in FIG. 7, the reduction gear 70 can have a motor 10 and a reduction assembly 71 connected with the motor 10 in the axial direction. The motor 10 has the structure of the motor according to embodiment 1. In embodiment 1, the structure of the motor 10 is described in detail, the content is included hereof, and the descriptions thereof are omitted herein.

In the present embodiment, as shown in FIG. 7, the reduction assembly 71 of the reduction gear 70 can have a gear 711 and a gear cover 713 disposed opposite to the gear 711 in the radial direction. The gear 711 and the gear cover 712 are disposed on the other axial side S2 of a motor body 11.

In the present embodiment, the reduction gear can be a vehicle-mounted product, but the present embodiment is not limited thereto, in other modes of execution, the reduction gear of embodiment 2 can also serve as a household speed reducer for a washing machine, an air purifier and the like, and moreover, the reduction gear can also serve as reduction devices installed on various information facilities, reduction devices used for industrial equipment and the like.

Through the motor structure in the reduction gear of the present embodiment, heat generated in the motor is well dissipated, so that the temperature of the motor can be lowered, the mechanical property of internal parts of the motor is not damaged, and the lightweight of the motor is facilitated.

The disclosure is described above with reference to particular embodiments. However, it should be understood by those skilled in the art that such a description is illustrative only, and not intended to limit the protection scope of the disclosure. Various variations and modifications may be made by those skilled in the art according to the principle of the disclosure, and such variants and modifications fall within the scope of the disclosure.

What is claimed is:

1. A motor, comprising:
   a motor body, disposed to be capable of rotating with a central axis as the centre,
   a first cover, covering at least one part of the motor body on a radial outer side of the motor body, and
   a second cover, covering at least one part of the motor body on one axial side and the radial outer side of the motor body, wherein the first cover and the second cover make contact on the radial outer side of the motor body,
   wherein
   the second cover is composed of a first part and a second part,
   the first part is in a disk shape extending along a plane perpendicular to an axial direction,
   the second part is located on a radial outer side of at least one part of the first part, and comprises a wall part and an eave part, the wall part is formed in the axial direction with the central axis of the motor body as the centre, and the eave part is formed in a radial direction from one axial end of a radial outer side of the wall part.

2. The motor according to claim 1, wherein protrusion parts are arranged on a surface of one side of the eave part.

3. The motor according to claim 2, wherein the protrusion parts are formed to be in a cylindrical shape or a rib shape.

4. The motor according to claim 1, wherein the eave part is composed of a plurality of stage parts and a plurality of notch parts which are disposed alternately.

5. The motor according to claim 4, wherein protrusion parts are arranged on surfaces of one sides of the plurality of stage parts.

6. The motor according to claim 5, wherein the protrusion parts are in the cylindrical shape or the rib shape.

7. The motor according to claim 1, wherein a first joint part is formed at a position, close to the second part, of the first part, a second joint part is formed at a position, close to the first part, of the second part, and the first joint part and the second joint part enable the first part and the second part to be jointed together.

8. The motor according to claim 7, wherein the first joint part is a clamping part formed towards a radial outer side, the second joint part is a groove formed towards the radial outer side from the wall part of the second part, and the clamping part is inserted into the groove to enable the first part and the second part to be embedded together.

9. The motor according to claim 7, wherein the first joint part and the second joint part are both sticking faces, and the first part and the second part are bonded together through the sticking faces.

10. The motor according to claim 1, wherein the first part is made of a plastic material, and the second part is made of a metal material.

11. The motor according to claim 1, wherein the second part is made of a material with heat conductivity not lower than 200 W/mK.

12. The motor according to claim 1, wherein a size ratio of the first part to the second part is 7 to 3.

13. The motor according to claim 1, wherein the motor is an axial magnetic flux motor.

14. A reduction gear, provided with a motor and a reduction assembly connected with the motor in an axial direction,
   wherein
   the motor is the motor according to claim 1,
   the reduction assembly is provided with a gear and a gear cover disposed opposite to the gear in a radial direction, the gear and the gear cover being disposed on the other axial side of the motor body.

* * * * *